United States Patent [19]
Schuler

[11] Patent Number: 6,075,303
[45] Date of Patent: Jun. 13, 2000

[54] HIGH-VOLTAGE INSULATED STATOR WINDING

[75] Inventor: Roland Schuler, Wettingen, Switzerland

[73] Assignee: Asea Brown Boveri AG, Baden, Switzerland

[21] Appl. No.: 09/311,342

[22] Filed: May 13, 1999

[30] Foreign Application Priority Data

May 16, 1998 [DE] Germany .................. 198 22 137

[51] Int. Cl.⁷ .................................................. H02K 3/04
[52] U.S. Cl. .......................... 310/201; 310/196; 174/127; 156/53
[58] Field of Search ............................ 310/201, 45, 196; 174/127, 121 SR, 120 C, 120 R; 523/457; 156/53, 56

[56] References Cited

U.S. PATENT DOCUMENTS

| | | | |
|---|---|---|---|
| 3,775,628 | 11/1973 | Andersson et al. | 310/208 |
| 3,811,005 | 5/1974 | Trunzo et al. | 174/121 SR |
| 4,034,153 | 7/1977 | Andres et al. | 174/120 SR |
| 4,112,183 | 9/1978 | Smith | 428/363 |
| 4,400,226 | 8/1983 | Horrigan | 156/56 |
| 4,616,407 | 10/1986 | Tamaki et al. | 29/596 |
| 4,675,470 | 6/1987 | Hata et al. | 174/25 R |
| 4,760,296 | 7/1988 | Johnston et al. | 310/45 |
| 4,769,276 | 9/1988 | Gruss et al. | 442/296 |
| 4,806,806 | 2/1989 | Hjortsberg et al. | 310/45 |
| 5,099,159 | 3/1992 | Liptak et al. | 310/45 |
| 5,674,340 | 10/1997 | Swiatkowski et al. | 156/184 |

FOREIGN PATENT DOCUMENTS

| | | |
|---|---|---|
| 0 287 813A2 | 10/1988 | European Pat. Off. . |
| 0 287 814A1 | 10/1988 | European Pat. Off. . |
| 0 356 928A1 | 3/1990 | European Pat. Off. . |
| 1490427 | 11/1969 | Germany . |
| 1513783 | 3/1970 | Germany . |
| 2723583 | 11/1978 | Germany . |
| 3114420A1 | 10/1982 | Germany . |
| 4218927A1 | 12/1993 | Germany . |

OTHER PUBLICATIONS

Japanese Patent Abstract, Publication No. 04222431, Publication Date Dec. 8, 1992.
European Search Report dated Aug. 20, 1999.
"Neue Plastwerkstoffe und ihre Anwendung in der Elektrotechnik", Ludeck, Elektrie 27 (1973), pp. 89–92.

Primary Examiner—Nestor Ramirez
Assistant Examiner—Joseph Waks
Attorney, Agent, or Firm—Burns, Doane, Swecker & Mathis, L.L.P.

[57] ABSTRACT

In a high-voltage insulated stator winding having at least one stator winding bar (10) for an electrical machine, which stator winding bar (10) is surrounded by winding insulation (13) which comprises a plurality of insulating layers (22) arranged one above the other, in which case each insulating layer (22) is composed of an insulating material arranged on a base (16), in particular in the form of Mica paper (14), improved dielectric utilization (withstand voltage) and improved thermal utilization (heat dissipation) are achieved to an equivalent extent in that a heat-resistant plastic film is used as the base (16), which plastic film is modified by introducing a filler which can resist corona discharges.

17 Claims, 1 Drawing Sheet

HIGH-VOLTAGE INSULATED STATOR WINDING

BACKGROUND OF THE INVENTION

1. Field of the Invention

The present invention relates to the field of electrical machines. It relates to a high-voltage insulated stator winding having at least one stator winding bar for an electrical machine, which stator winding bar is surrounded by winding insulation which comprises a plurality of insulating layers arranged one above the other, in which case each insulating layer is composed of an insulating material arranged on a base, in particular in the form of Mica paper.

Such a stator winding, in which a fabric or a non-woven is used as the base for the Mica paper, is generally known from the prior art.

2. Discussion of Background

In high-voltage generators, as are used for generating electricity, or high-voltage motors, the stator winding is normally composed of winding bars which are inserted into corresponding slots in the laminated stator core, and are fixed there. For insulation from the laminated stator core, the stator winding is surrounded by winding insulation which is resistant to high voltage, and a number of layers of which are wound as a strip around the winding bars and are subsequently impregnated with (solvent-free) impregnation resin. The insulating winding strip is essentially composed of Mica paper, which, for mechanical reasons, is applied to a base and is connected to this base. A fabric or non-woven composed of insulating material (glass or plastic fibers) is normally used as the base material. In this case, the base also provides the intermediate spaces which are required for the subsequent impregnation.

Increasingly stringent requirements for the withstand voltage of any given material for the winding insulation are leading to an increase in the thickness of the insulation and in the number of wound layers. However, as the thickness increases, the heat transfer between the winding and the laminated stator core deteriorates at the same time, and this is leading to problems in the dissipation of heat losses. Furthermore, for any given stator geometry, the winding must be designed with a smaller conductor cross section, thus resulting in a reduction in the power generated.

SUMMARY OF THE INVENTION

Accordingly, one object of the invention is to provide novel winding insulation in order to improve the utilization of the machine, which improved winding insulation is equally distinguished by improved dielectric utilization (withstand voltage) and improved thermal utilization (heat resistance).

In the case of a stator winding of the type mentioned initially, the object is achieved in that a (high-quality) heat-resistant plastic film is used as the base, which plastic film is modified by introducing a filler which can resist corona discharges. By using a modified plastic film, as is marketed by the DuPont Company, for example, under the trade name KAPTON CR, and which for insulation of wires has already been used, as the base material, the thickness of the winding insulation can be reduced for the same dielectric resistance, or the dielectric resistance can be increased for the same thickness. The structure of the insulation is at the same time homogenized by the film-like base. The use of such a film allows an operating field strength of more than 3 kV/mm and a thermal machine utilization better than Class F to be achieved.

A first preferred embodiment of the invention is distinguished by the use of a plastic film composed of a polyimide or Polyethylene Naphthalate (PEN) as the base, and by the use of a metal oxide, in particular aluminum oxide or boron nitride, as the filler. The specific choice of the film material ensures that the base complies with the mechanical and electrical requirements. The filler gives the base resistance to the degrading effect of corona discharges and glow discharges.

A particularly advantageous combination of mechanical and electrical characteristics is obtained if, according to a second preferred embodiment of the invention, the base is formed from the three layers, in which case a core layer which contains no filler is arranged between two covering layers which contain filler, and the thickness of each of the three layers of the base is about ⅓ of the thickness of the base. The unfilled core layer primarily guarantees the mechanical strength, while the filled covering layers protect the surface of the base from corona discharges.

A further preferred embodiment of the stator winding according to the invention, which has been proven in practice, is distinguished by the winding insulation being impregnated with an impregnation resin, by channels being arranged between the insulating layers in order to simplify the impregnation, by intermediate layers composed of a fabric, in particular a glass fabric, being arranged between the insulating layers in order to form the channels, by the ratio of the thicknesses of an insulating layer and an intermediate layer being about 5:1, and by a plurality of insulating layers being arranged between each of the intermediate layers, in such a manner that the overall ratio of the number of insulating layers to the number of intermediate layers is 5:1. This allows adequate impregnation without unnecessarily degrading the electrical and thermal characteristics of the winding insulation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
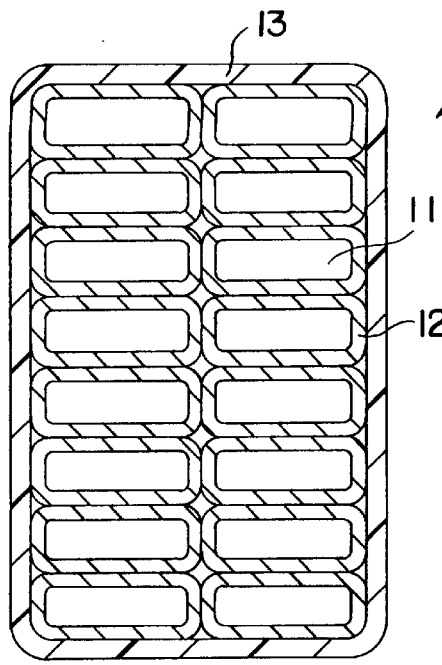
FIG. 1 shows a cross section of an example of the design of a stator winding bar, such as that on which the invention is based.
Figure 2:
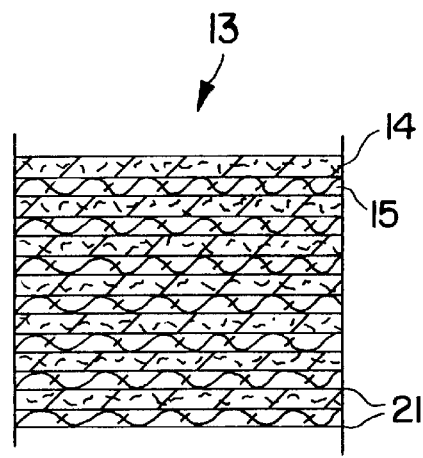
FIG. 2 shows an enlarged illustration of a detail of winding insulation according to the prior art, using Mica paper on a fabric-like base.

Referring now to the drawings, wherein like reference numerals designate identical or corresponding parts throughout the several views, FIG. 1 shows a cross section of an example of the design of a stator winding bar, such as that on which the invention is based. The stator winding bar 10 has an essentially rectangular cross section and comprises a plurality of closely packed conductor elements 11 (for example composed of copper), which are individually surrounded by conductor element insulation 12 and form a packet which is surrounded overall on the outside by winding insulation 13. In the prior art, the winding insulation 13 has a structure such as that illustrated in the enlarged detail in FIG. 2. The winding insulation 13 accordingly comprises a large number of insulating layers 21, which are wound one on top of the other. Each insulating layer 21, for its part, is composed of a layer of Mica paper 14 and a further layer, namely a base 15 which is connected over a large area to the Mica paper 14 and gives the insulating layer 21 the necessary mechanical strength. The base 15 in the prior art is, as a rule, composed of a comparatively thick fabric or nonwoven, as a result of which the packaging density of the dielectrically effective Mica paper 14 is reduced.

Figure 3:
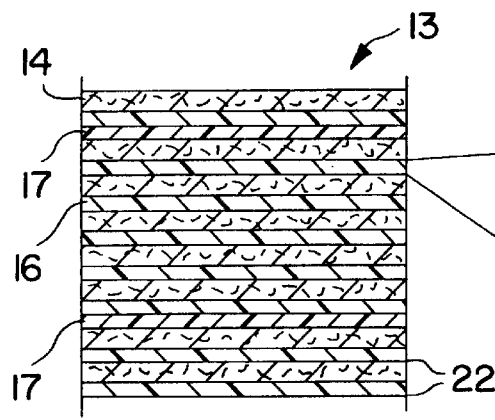
FIG. 3 shows an enlarged illustration of a detail of winding insulation according to a preferred embodiment of the invention, with Mica paper on a base composed of a modified plastic film with fabric-like intermediate layers.

The invention now adopts a different approach, as shown in FIG. 3: a comparatively thin, modified plastic film is used as the base 16 for the Mica paper 14 in the insulating layers 22, preferably being composed of a thermally high-quality plastic film consisting of polyimide or Polyethylene Naphthalate (PEN) and containing a metal oxide, in particular aluminum oxide or boron nitride, as the filler. The filler ensures that the plastic film can resist corona discharges and glow discharges. A suitable modified plastic film is commercially available, for example from the DuPont Company under the trade name KAPTON CR.

Figure 4:
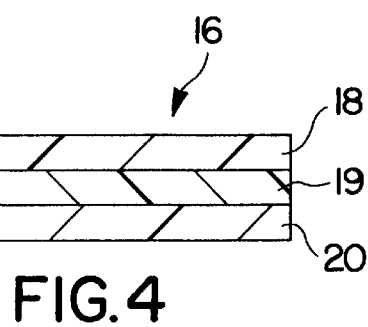
FIG. 4 shows a detail, enlarged in comparison with FIG. 3, of the internal three-layer structure of an insulating tape combination according to another preferred exemplary embodiment of the invention.

In principle, the filler may be distributed uniformly in the film. However, since the filler degrades the mechanical characteristics of the film and is required mainly in the regions of the film close to the surface, it is particularly advantageous if, as shown in FIG. 4, the individual base 16 is composed of three layers, in which case a core layer 19 which contains no filler is arranged between two covering layers 18 and 20 which contain filler. The thickness of each of the three layers 18, 19 and 20 of the base 16 is about ⅓ of the thickness of the base 16. Such a film as the base 16 increases, in particular, the long-term dielectric resistance of the insulation by several times in comparison with the known fabric structure shown in FIG. 2, depending on the insulation structure.

A disadvantage of an insulation structure formed just from Mica paper 14 and a film base 16 is that, particularly with relatively large thicknesses—as are normal for high-voltage generators-, the structure can be impregnated all the way through only with difficulty, since, in comparison with the fabric base 15, the film base 16 makes it harder for the impregnation resin to penetrate the insulation structure. it is thus advantageous if, as shown in FIG. 3, fine channels are arranged between the insulating layers 22 in order to simplify the impregnation, which channels are formed by intermediate layers 17 arranged between the insulating layers 22 and composed of a fine fabric, in particular glass fabric. The ratio of the thicknesses of an insulating layer 22 and an intermediate layer 17 is in this case preferably about 5:1. For reliable impregnation through the winding insulation 13, it is in this case sufficient for a plurality of insulating layers 22 to be arranged between each of the intermediate layers 17, in such a manner that the overall ratio of the number of insulating layers 21 to the number of intermediate layers 17 is 5:1. The intermediate layers 17 not only assist the impregnation, but, furthermore, also mechanically reinforce the final insulation structure.

Alternatively, the intermediate layers 17 can be entirely dispensed with if the thicknesses of the winding insulation 13 are small.

Figure 5:
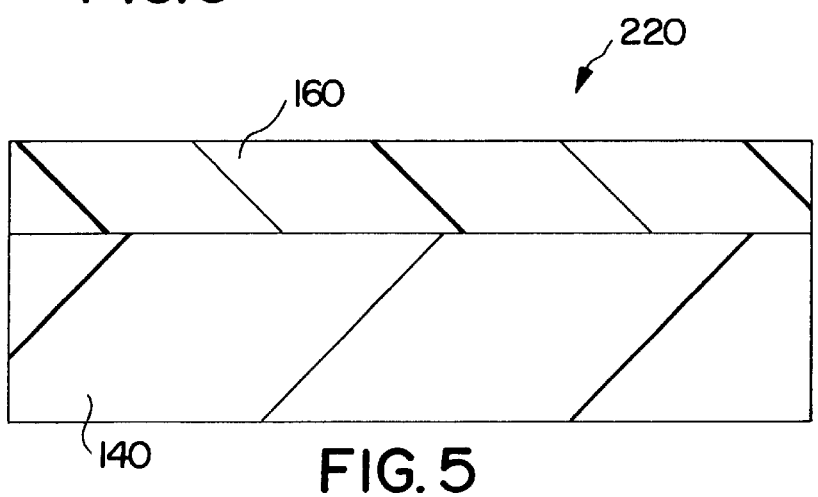
FIG. 5 shows an insulating layer composed of an insulating material arranged on a base in accordance with an exemplary embodiment of the invention, wherein a ratio of the thicknesses of the insulating material and the base is about 2:1.

FIG. 5 shows an insulating layer 220 in accordance with an exemplary embodiment of the invention, including a base 160 that is about half the thickness of an insulation material 140. The base 160 can be, for example, a modified plastic film as described above with respect to the film base 16. The insulation material 140 can be, for example, Mica paper as described above with respect to the layer of Mica paper 14.

Overall, the invention results in a stator winding having winding insulation whose dielectric and thermal characteristics are greatly improved.

Obviously, numerous modifications and variations of the present invention are possible in light of the above teachings. It is therefore to be understood that, within the scope of the appended claims, the invention may be practiced otherwise than as specifically described herein.

What is claimed as new:

1. A high-voltage insulated stator winding having at least one stator winding bar for an electrical machine, which stator winding bar is surrounded by a winding insulation which comprises a plurality of insulating layers, wherein each of the plurality of insulating layers is composed of an insulating material arranged on a base that is resistive to corona discharges, the base comprising a plastic film composed of Polyethylene Naphthalate (PEN).

2. The stator winding as claimed in claim 1, wherein a metal oxide is used as the filler.

3. The winding of claim 2, wherein the filler is aluminum oxide.

4. The stator winding as claimed in claim 2, wherein a boron nitride is used as the filler.

5. The stator winding as claimed in claim 1, wherein the base comprises a core layer, which contains no filler, and two covering layers which contain filler, the core layer is arranged between the two covering layers and at least one of the two covering layers separates the core layer from the insulating material.

6. The stator winding as claimed in claim 5, wherein a thickness of each of the three layers of the base is about ⅓ of a thickness of the base.

7. The stator winding as claimed in claim 1, wherein a ratio of a thickness of the insulating material to a thickness of the base within at least one of the plurality of insulating layers is about 2:1.

8. The stator winding as claimed in claim 1, wherein the winding insulation is impregnated with an impregnation resin.

9. The stator winding as claimed in claim 8, wherein channels are arranged between the insulating layers, in order to simplify an impregnation of the winding insulation with the impregnation resin.

10. The stator winding as claimed in claim 9, further comprising intermediate layers arranged between ones of the plurality of insulating layers, in order to form the channels.

11. The stator winding as claimed in claim 10, wherein a ratio of a thickness of one of the plurality of insulating layers and one of the intermediate layers is about 5:1.

12. The stator winding as claimed in claim 10, wherein a plurality of ones of the plurality of insulating layers is arranged between each of the intermediate layers, in such a manner that an overall ratio of a number of insulating layers to a number of intermediate layers is 5:1.

13. The winding of claim 9, wherein the intermediate layers comprise a glass fabric.

14. The winding of claim 1, wherein the insulating material is Mica paper and the base is a heat-resistant plastic film having a filler that is resistive to corona discharges.

15. A high-voltage insulated stator winding having at least one stator winding bar for an electrical machine, wherein:

the stator winding bar is surrounded by a winding insulation comprising a plurality of insulating layers;

each of the plurality of insulating layers comprises an insulating material arranged on a base;

the base comprises three layers of a heat-resistant plastic film;

two of the three layers of the heat-resistant plastic film contain a filler that is resistive to corona discharges;

the third layer of the heat-resistant plastic film does not contain the filler;

and the third layer of the heat-resistant plastic film is arranged between the other two of the three layers of the heat-resistant plastic film.

16. The device of claim 15, wherein the third layer separates the other two of the three layers.

17. The device of claim 15, wherein at least one of the other two of the three layers separates the third layer from the insulating material.

* * * * *